United States Patent
Hong et al.

(12) 
(10) Patent No.: US 8,980,481 B2
(45) Date of Patent: Mar. 17, 2015

(54) NON-AQUEOUS ELECTROLYTE SOLUTION FOR LITHIUM SECONDARY BATTERY AND LITHIUM SECONDARY BATTERY INCLUDING THE SAME

(75) Inventors: Yeon-Suk Hong, Daejeon (KR); Jae-Seung Oh, Seoul (KR); Ji-Won Park, Daejeon (KR); Byoung-Bae Lee, Chungcheongnam-do (KR); Dong-Su Kim, Daejeon (KR); Hyo-Jin Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 790 days.

(21) Appl. No.: 13/260,485

(22) PCT Filed: Jul. 9, 2010

(86) PCT No.: PCT/KR2010/004482
§ 371 (c)(1),
(2), (4) Date: Sep. 26, 2011

(87) PCT Pub. No.: WO2011/005054
PCT Pub. Date: Jan. 13, 2011

(65) Prior Publication Data
US 2012/0034533 A1    Feb. 9, 2012

(30) Foreign Application Priority Data
Jul. 9, 2009    (KR) ........................ 10-2009-0062583

(51) Int. Cl.
| | |
|---|---|
| *H01M 10/052* | (2010.01) |
| *H01M 10/0567* | (2010.01) |
| *H01M 10/0568* | (2010.01) |
| *H01M 4/525* | (2010.01) |
| *H01M 4/52* | (2010.01) |
| *H01M 10/0569* | (2010.01) |

(52) U.S. Cl.
CPC ........ *H01M 10/052* (2013.01); *H01M 10/0568* (2013.01); *H01M 4/525* (2013.01); *H01M 4/52* (2013.01); *H01M 10/0569* (2013.01); *H01M 10/0567* (2013.01); *Y02E 60/122* (2013.01)
USPC ........................................ 429/332

(58) Field of Classification Search
CPC .......... H01M 10/052; H01M 10/0567; H01M 10/0569; H01M 10/0568; H01M 4/52; H01M 4/525; Y02E 60/122
USPC .......... 429/307, 323, 231.3, 231.1, 330, 332, 429/338, 342; 252/62.2
See application file for complete search history.

(56) References Cited

U.S. PATENT DOCUMENTS

| | | | |
|---|---|---|---|
| 6,797,437 | B2 | 9/2004 | Tsukamoto et al. |
| 7,718,322 | B2 | 5/2010 | Lee et al. |
| 7,776,476 | B2 | 8/2010 | Ihara et al. |
| 7,939,206 | B2 | 5/2011 | Otsuki et al. |
| 2006/0194118 | A1 | 8/2006 | Yew et al. |
| 2008/0226977 | A1* | 9/2008 | Kim et al. ................. 429/231.95 |
| 2009/0226808 | A1* | 9/2009 | Hiwara et al. ................. 429/200 |
| 2009/0253045 | A1 | 10/2009 | Kotato et al. |

FOREIGN PATENT DOCUMENTS

| | | |
|---|---|---|
| CN | 1866605 A | 11/2006 |
| EP | 1696501 A1 | 8/2006 |
| EP | 1970989 A1 | 9/2008 |
| JP | 8-321312 A | 12/1996 |
| JP | 9-259925 A | 10/1997 |
| JP | 2000-48820 A | 2/2000 |
| JP | 2005-190873 A | 7/2005 |
| JP | 2006-179458 A | 7/2006 |
| JP | 2007-273396 A | 10/2007 |
| JP | 2008-10414 A | 1/2008 |
| JP | 2009-123465 A | 6/2009 |
| JP | 2009-123499 A | 6/2009 |
| KR | 10-2005-0078443 A | 8/2005 |
| KR | 10-0578873 B1 | 5/2006 |
| KR | 10-2006-0065534 A | 6/2006 |

OTHER PUBLICATIONS

International Search Report issued in PCT/KR2010/004482 dated Feb. 22, 2011.

* cited by examiner

*Primary Examiner* — Laura Weiner
(74) *Attorney, Agent, or Firm* — Birch, Stewart, Kolasch & Birch, LLP

(57) ABSTRACT

Disclosed is a non-aqueous electrolyte solution for a lithium secondary battery. The non-aqueous electrolyte solution includes a lithium salt, an organic solvent and additives. The additives include: 1 to 10% by weight of a mixture of a particular halogenated cyclic carbonate and a compound containing a vinylene or vinyl group; and 0.1 to 9% by weight of a nitrile compound having a $C_2$-$C_{12}$ alkoxyalkyl group. A lithium secondary battery including the non-aqueous electrolyte solution is also disclosed. The lithium secondary battery is protected from catching fire when overcharged and is prevented from swelling during storage at high temperature.

11 Claims, 3 Drawing Sheets

NON-AQUEOUS ELECTROLYTE SOLUTION FOR LITHIUM SECONDARY BATTERY AND LITHIUM SECONDARY BATTERY INCLUDING THE SAME

TECHNICAL FIELD

The present invention relates to a non-aqueous electrolyte solution for a lithium secondary battery that includes three additive components to achieve good safety and prevent swelling of the battery. The present invention also relates to a lithium secondary battery including the non-aqueous electrolyte solution.

BACKGROUND ART

Energy storage technology is attracting more and more attention in recent years. As the applicability of energy storage technology is extending to mobile phones, camcorders, notebook PCs and even electric automobiles, there is a growing demand for high energy-density batteries as power sources for such electronic devices. Under these circumstances, lithium secondary batteries are considered as the most promising batteries and research on lithium secondary batteries is being actively undertaken.

Many secondary batteries are currently available. Of these, a typical example of the lithium secondary batteries developed in the early 1990's includes an anode made of a carbon material capable of intercalating/deintercalating lithium ions, a cathode made of a lithium-containing oxide and a non-aqueous electrolyte solution containing a lithium salt in a mixture of organic solvents.

Ethylene carbonate, propylene carbonate, dimethoxyethane, γ-butyrolactone, N,N-dimethylformamide, tetrahydrofuran, acetonitrile, etc. are currently widely used as organic solvents for non-aqueous electrolyte solutions. However, electrolyte solutions containing these organic solvents are prone to oxidation during long-term storage at high temperatures. As a result of such oxidation, gases are generated and deform the stable structure of batteries. In a serious case, heat is generated inside batteries when overcharged or overdischarged and causes internal short circuits of the batteries, posing the danger of fire or explosion of the batteries.

Numerous attempts to solve such problems have been made, for example, (1) by using porous polyolefin separators having a high enough melting point to prevent melting in high-temperature environments or (2) by adding flame retardant solvents or additives to electrolyte solutions to improve the safety of batteries at high temperatures.

However, a high melting point of a general polyolefin separator for a lithium secondary battery is accomplished by increasing the film thickness. This relatively decreases the amount of an anode and a cathode to be loaded, inevitably leading to a reduction in the capacity of the battery. Since the polyolefin film has a melting point around 150° C. because of the characteristics of its materials such as PE and PP, the separator may be melted by drastic internal heat of the battery arising from the oxidation of an electrolyte solution when overcharged. Such melting causes internal short circuits of the battery, and as a result, the problems of fire and explosion of the battery are difficult to avoid.

Japanese Unexamined Patent Publication No. 1997-259925 discloses the addition of a nonflammable gas having a boiling point not higher than 25° C. during assembly of an electrolyte solution. Several patent publications including Japanese Unexamined Patent Publication Nos. 2006-179458 and 2005-190873 describe the addition of phosphoric acid esters to carbonate electrolyte solutions for the purpose of ensuring nonflammability of the electrolyte solutions. U.S. Pat. No. 6,797,437 describes the addition of at least 30% of a nonflammable solvent such as a perfluoroalkyl or perfluoroester compound. However, injection of the nonflammable gas causes swelling of the battery and involves complex battery assembly steps. The phosphate additives cause deterioration of battery performance owing to high reduction potentials thereof. Furthermore, the perfluoroalkyl compound undergoes phase separation with an electrolyte solution containing an organic solvent. Such phase separation leads to the eduction of lithium salts.

DISCLOSURE

Technical Problem

It is an object of the present invention to provide a non-aqueous electrolyte solution for a lithium secondary battery that can protect the battery from catching fire when overcharged to improve the safety of the battery, and a lithium secondary battery including the non-aqueous electrolyte solution.

It is another object of the present invention to provide a non-aqueous electrolyte solution for a lithium secondary battery that can inhibit the generation of gases during storage at high temperature to markedly prevent the battery from swelling, and a lithium secondary battery including the non-aqueous electrolyte solution.

Technical Solution

In order to achieve these objects, the present invention provides a non-aqueous electrolyte solution for a lithium secondary battery including an ionizable lithium salt, an organic solvent and additives wherein the additives include (a) 1 to 10% by weight of a mixture of a halogenated cyclic carbonate represented by Formula 1:

wherein X and Y are each independently hydrogen, chlorine or fluorine, with the proviso that X and Y are not simultaneously hydrogen, and a compound containing a vinylene or vinyl group, based on the total weight of the non-aqueous electrolyte solution, and (b) 0.1 to 9% by weight of a nitrile compound having a $C_2$-$C_{12}$ alkoxyalkyl group, based on the total weight of the non-aqueous electrolyte solution.

As used herein, the terms "vinylene group" and "vinyl group" refer to —CH=CH— and $CH_2$=CH—, respectively.

Examples of vinylene or vinyl group-containing compounds suitable for use in the non-aqueous electrolyte solution of the present invention include vinylene carbonate compounds, vinyl group-containing, acrylate compounds, vinyl group-containing sulfonate compounds, and vinyl group-containing ethylene carbonate compounds. These compounds may be used alone or as a mixture of two or more thereof. More specifically, a representative example of the vinylene carbonate compounds is vinylene carbonate. An example of the vinyl group-containing compounds may be represented by Formula 2:

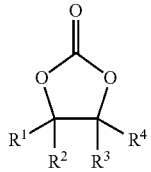

(2)

wherein at least one of $R^1$ to $R^4$ includes a vinyl group and the others are each independently hydrogen, halogen, a $C_1$-$C_6$ alkyl group optionally substituted with halogen, a $C_6$-$C_{12}$ aryl group, a $C_2$-$C_6$ alkenyl group or a sulfonate group.

The alkoxyalkylnitrile compound may be represented by Formula 3:

$$C_nH_{2n+1}OC_mH_{2m}CN \qquad (3)$$

wherein n and m are each independently an integer from 1 to 6.

Advantageous Effects

The non-aqueous electrolyte solution of the present invention can be used to provide a battery that is safe from overcharge and possesses excellent charge/discharge performance.

In addition, the non-aqueous electrolyte solution of the present invention can inhibit generation of gasses during storage at high temperature to prevent battery swelling.

DESCRIPTION OF DRAWINGS

The accompanying drawings illustrate preferred embodiments of the invention, and together with the foregoing disclosure, serve to provide further understanding of the technical spirit of the invention. However, the present invention is not to be construed as being limited to the drawings.

MODE FOR INVENTION

Figure 1:
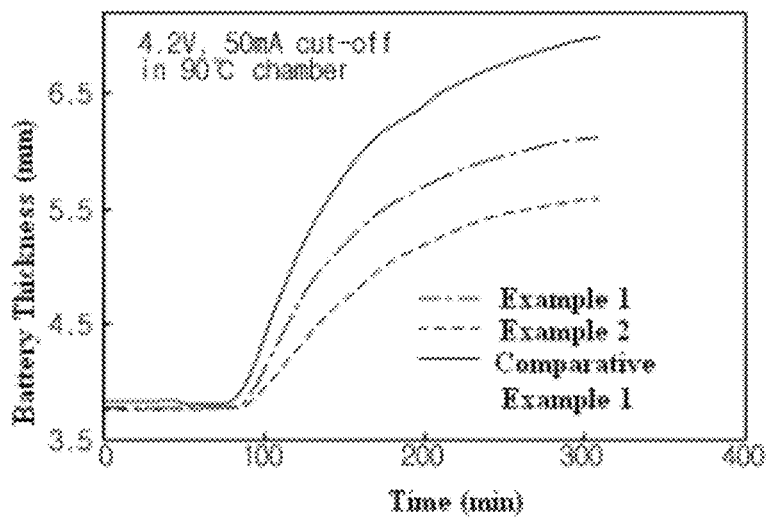
FIG. 1 is a graph showing real-time variations in the thickness of batteries manufactured in Examples 1-2 and Comparative Example 1 during storage in an oven at 90° C. in a full-charge state at 4.2 V.

The present invention will now be described in detail with reference to the drawings. It should be understood that terms and words used in the specification and the appended claims should not be construed as having common and dictionary meanings, but should be interpreted as having meanings and concepts corresponding to technical ideas of the present invention in view of the principle that the inventor can properly define the concepts of the terms and words in order to describe his/her own invention as best as possible.

The present invention provides a non-aqueous electrolyte solution for a lithium secondary battery including an ionizable lithium salt, an organic solvent and additives wherein the additives include (a) 1 to 10% by weight of a mixture of a halogenated cyclic carbonate represented by Formula 1:

(1)

wherein X and Y are each independently hydrogen, chlorine or fluorine, with the proviso that X and Y are not simultaneously hydrogen, and a compound containing a vinylene or vinyl group, based on the total weight of the non-aqueous electrolyte solution, and (b) 0.1 to 9% by weight of a nitrile compound having a $C_2$-$C_{12}$ alkoxyalkyl group, based on the total weight of the non-aqueous electrolyte solution.

The halogenated cyclic carbonate and the vinylene or vinyl group-containing compound form a passivation film, called a solid electrolyte interface (SEI) film, on the surface of an anode when charged to retard micro- or macro thermal short circuits occurring inside the battery. The mixture of the halogenated cyclic carbonate and the vinylene or vinyl group-containing compound can prevent or delay explosion of a battery by external heat, compared to ethylene carbonate as an organic solvent widely used in non-aqueous electrolyte solutions.

However, if the halogenated cyclic carbonate and the vinylene or vinyl group-containing compound are used in a carbonate electrolyte solution, they are readily decomposed at a high temperature owing to thermal instability thereof. During decomposition, gases are generated and deform a pouch- or can-type battery assembly to cause internal short circuits of the battery. In an extreme case, fire or explosion of the battery may occur.

As described above, the use of the halogenated cyclic carbonate and the vinylene or vinyl group-containing compound cannot ensure sufficient safety of a battery when internal short circuits of the battery occur. In the present invention, this safety problem is solved by the use of the alkoxyalkylnitrile compound as another additive. The combination of the three additives leads to the formation of a complex on the surface of a cathode composed of a lithium-transition metal oxide to inhibit oxidation reactions between the electrolyte solution and the cathode. The complex formation inhibits heat generation and prevents internal short circuits of the battery resulting from drastic temperature rise of the battery. In addition, the decomposition of the electrolyte solution including the halogenated cyclic carbonate and the vinylene or vinyl group-containing compound during storage at high temperature is inhibited, so that swelling of the battery can be effectively suppressed.

Furthermore, the use of the alkoxyalkylnitrile compound is also advantageously effective in terms of battery performance. The alkoxyalkylnitrile compound has a higher dielectric constant and a lower viscosity than straight-chain carbonate compounds and aliphatic mononitrile compounds. Due to these advantages, the alkoxyalkylnitrile compound increases the conductivity of the electrolyte solution and reduces the interfacial resistance of a battery after assembly to impart the battery with excellent electrochemical properties.

Specific examples of vinylene or vinyl group-containing compounds suitable for use in the present invention include vinylene carbonate compounds, vinyl group-containing acrylate compounds, vinyl group-containing sulfonate compounds, and vinyl group-containing ethylene carbonate compounds.

A more specific example of the vinylene carbonate compound is vinylene carbonate. An example of the vinyl group-containing compounds may be represented by Formula 2:

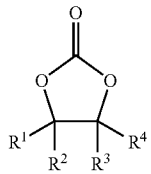

(2)

wherein at least one of $R^1$ to $R^4$ includes a vinyl group and the others are each independently hydrogen, halogen, a $C_1$-$C_6$ alkyl group optionally substituted with halogen, a $C_6$-$C_{12}$ aryl group, a $C_2$-$C_6$ alkenyl group or a sulfonate group.

The halogenated cyclic carbonate of Formula 1 and the vinylene or vinyl group-containing compound are preferably present in a total amount of 1 to 10% by weight, based on the total weight of the non-aqueous electrolyte solution. If the additive mixture is present in an amount of less than 1% by weight, the inhibitory effect on swelling of a battery at high temperature is negligible. Meanwhile, if the additive mixture is present in an amount of more than 10% by weight, the high-temperature cycle life characteristics of a battery are greatly deteriorated as charge/discharge cycles proceed at high temperature.

The mixing ratio of the halogenated cyclic carbonate of Formula 1 to the vinylene or vinyl group-containing compound may be suitably adopted depending on the specific application of a battery. For example, the halogenated cyclic carbonate and the vinylene or vinyl group-containing compound may be mixed in a weight ratio ranging from 1:0.5 to 1:5, but the mixing ratio thereof is not limited to this range. The presence of the vinylene or vinyl group-containing compound, which forms a dense SEI film, in an amount of less than the lower limit deteriorates the charge/discharge performance of a battery at high temperature. Meanwhile, the presence of the vinylene or vinyl group-containing compound in an amount more than the upper limit makes a dense SEI film, which is formed by polymerization of the vinylene or vinyl group, thick and greatly increases the interfacial resistance of an anode, thus deteriorating the initial performance of a battery.

The alkoxyalkyl group of the alkoxyalkylnitrile compound preferably has 2 to 12 carbon atoms. For example, the alkoxyalkylnitrile compound may be represented by Formula 3:

$$C_nH_{2n+1}OC_mH_{2m}CN \quad (3)$$

wherein n and m are each independently an integer from 1 to 6.

Specific examples of alkoxyalkylnitrile compounds suitable for use in the present invention include, but are not limited to, methoxyacetonitrile, methoxypropionitrile, methoxybutyronitrile, methoxyvaleronitrile, ethoxyacetonitrile, ethoxypropionitrile, ethoxybutyronitrile, and ethoxyvaleronitrile. These alkoxyalkylnitrile compounds may be used alone or as a mixture of two or more thereof.

The alkoxyalkylnitrile compound is preferably present in an amount of 0.1 to 9% by weight, more preferably 1 to 7% by weight, based on the total weight of the non-aqueous electrolyte solution.

The presence of the alkoxyalkylnitrile compound in an amount of less than 0.1% by weight does not contribute to the improvement in the safety of a battery when overcharged and does not sufficiently prevent battery swelling. Meanwhile, the presence of the alkoxyalkylnitrile compound in an amount of more than 9% by weight greatly deteriorates the high-temperature cycle life characteristics of a battery as charge/discharge cycles proceed at high temperature.

The non-aqueous electrolyte solution of the present invention may optionally further include a compound capable of forming a passivation film on the surface of an anode within the scope of the present invention. Non-limiting examples of such optional compounds include: sulfur (S) compounds, such as propane sultone, ethylene sulfite and 1,3-propane sultone; and lactam compounds, such as N-acetyl lactam. The additional additive is preferably present in an amount of 0.1 to 10% by weight, based on the total weight of the non-aqueous electrolyte solution.

The lithium salt used as an electrolyte in the non-aqueous electrolyte solution of the present invention may be any of those commonly used in electrolyte solutions for lithium secondary batteries. For example, the anion of the lithium salt may be selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The organic solvent of the non-aqueous electrolyte solution according to the present invention may be any of those commonly used in electrolyte solutions for lithium secondary batteries. Representative examples of such organic solvents include linear carbonate compounds and cyclic carbonate compounds. These organic solvents may be used alone or as a mixture of two or more thereof. Specific examples of the carbonate compounds include, but are not limited to, propylene carbonate (PC), ethylene carbonate (EC), diethyl carbonate (DEC), dimethyl carbonate (DMC), ethyl methyl carbonate (EMC), methyl propyl carbonate and dipropyl carbonate. These carbonate compounds may be used alone or as a mixture of two or more thereof.

Ethylene carbonate and propylene carbonate are preferred as cyclic carbonate compounds because they are highly viscous and have dielectric constants high enough to dissociate the lithium salt in the electrolyte. The use of a mixture of the cyclic carbonate with a highly viscous, low dielectric-constant linear carbonate such as dimethyl carbonate or diethyl carbonate in an appropriate ratio is more preferred because high electrical conductivity of the electrolyte solution is ensured.

When the carbonate mixture includes the linear carbonate, the alkoxyalkyl nitrile compound may be present in an amount of 1 to 20 parts by weight, based on 100 parts by weight of the linear carbonate. If the nitrile compound is present in an amount of less than 1 part by weight, the inhibitory effect on swelling of a battery at high temperature and the effect of improving the safety of a battery when overcharged are negligible. Meanwhile, if the nitrile compound is present in an amount exceeding 20 parts by weight, the long-term charge/discharge performance of a battery may be deteriorated.

In addition to the above carbonate compounds, other examples of suitable organic solvents include dimethylsulfoxide, acetonitrile, dimethoxyethane, diethoxyethane, sulfolane, γ-butyrolactone, propylene sulfite and tetrahydrofuran. These organic solvents may be used alone or as a mixture of two or more thereof.

The present invention also provides a lithium secondary battery including the non-aqueous electrolyte solution. The lithium secondary battery of the present invention is manufactured by injecting the non-aqueous electrolyte solution into an electrode assembly including a cathode, an anode and a separator interposed between the two electrodes. The cathode, the anode and the separator may be those commonly used for the manufacture of lithium secondary batteries.

A lithium-containing transition metal oxide is preferably used as an active material of the cathode. Specifically, the cathode active material may be selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_b$-$Mn_c)O_2$ (0.5<x<1.3, 0<a<1, 0<b<1, 0<c<1, a+b+c=1), $Li_xNi_{1-y}CO_yO_2$ (0.5<x<1.3, 0<y<1), $Li_xCO_{1-y}Mn_yO_2$ (0.5<x<1.3, 0≤y<1), $Li_xNi_{1-y}Mn_yO_2$ (0.5<x<1.3, 0≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}CO_zO_4$ (0.5<x<1.3, 0<z<2), $Li_xCoPO_4$ (0.5<x<1.3), $Li_xFePO_4$ (0.5<x<1.3), and mixtures thereof. The lithium-containing transition metal oxide may be coated with a metal, such as aluminum (Al), or a metal oxide. A transition metal sulfide, selenide or halide may also be used as the cathode active material. Preferably, a mixture of $Li_xCoO_2$ (0.5<x<1.3) and $Li_x(Ni_aCo_bMn_c)O_2$ (0.5<x<1.3, 0<a<1, 0<b<1, 0<c<1, a+b+c=1) or $Li_xCoO_2$ (0.5<x<1.3) coated with aluminum is used as the cathode active material. Particularly, the $Li_xCoO_2/Li_x(Ni_aCo_bMn_c)O_2$ mixture exhibits high energy density and high capacity but tends to swell. The combined use of the $LixCoO_2/Li_x(Ni_aCo_bMn_c)O_2$ mixture with the non-aqueous electrolyte solution of the present invention effective in preventing swelling can impart higher performance to the lithium secondary battery. Aluminum coated-$Li_xCoO_2$ (0.5<x<1.3) is very effective in preventing side reactions with the electrolyte solution.

The combined use of aluminum coated-$Li_xCoO_2$ (0.5<x<1.3) with the non-aqueous electrolyte solution of the present invention further effectively prevents swelling of the lithium secondary battery.

As an active material of the anode, a carbon material, lithium metal, silicon or tin capable of intercalating/de intercalating lithium ions may be used. A metal oxide such as $TiO_2$ or $SnO_2$ having a potential of less than 2 V for lithium may also be used as the anode active material. A carbon material is preferred as the anode active material. The carbon material may be a low-crystalline or high-crystalline one. Examples of low-crystalline carbon materials include soft carbon and hard carbon. Examples of high-crystalline carbon materials include natural graphite, Kish graphite, pyrolytic carbon, mesophase pitch based carbon fiber, meso-carbon microbeads, mesophase pitches, and high-temperature sintered carbon materials, such as petroleum or coal tar pitch derived cokes. The anode may include a binding agent. The binding agent may be selected from various kinds of binder polymers, such as vinylidene fluoride-hexafluoropropylene copolymers (PVDF-co-HFP), polyvinylidene fluoride, polyacrylonitrile and polymethylmethacrylate.

The separator may be a porous polymer film commonly used in separators for lithium secondary batteries. Examples of materials for the porous polymer film include polyolefin polymers, such as ethylene homopolymers, propylene homopolymers, ethylene/butane copolymers, ethylene/hexane copolymers and ethylene/methacrylate copolymers. The separator may be a laminate of two or more porous polymer films. The separator may be a porous non-woven fabric. Examples of materials for the porous non-woven fabric include, but are not limited to high melting-point glass fiber and polyethylene terephthalate fiber.

The shape of the lithium secondary battery according to the present invention is not particularly limited. For example, the lithium secondary battery of the present invention may be cylindrical, prismatic, pouch-type and coin-type in shape.

Hereinafter, the present invention will be explained in detail with reference to embodiments. The embodiments of the present invention, however, may take several other forms, and the scope of the invention should not be construed as being limited to the following examples. The embodiments of the present invention are provided to more fully explain the present invention to those skilled in the art.

Example 1

A 1M solution of $LiPF_6$ in a mixture of EC, PC and DEC (3:2:5, w/w/w) was prepared, and then 3 wt % of vinylene carbonate, 2 wt % of fluoroethylene carbonate (FEC) and 5 wt % of methoxypropionitrile (MPN) were added thereto to prepare an electrolyte solution.

In accordance with a standard method known in the art, a lithium polymer battery was manufactured using the electrolyte solution, artificial graphite as an anode active material and $LiCoO_2$ as a cathode active material. The lithium polymer battery was packaged with an aluminum laminate.

Example 2

A lithium polymer battery was manufactured in the same manner as in Example 1, except that methoxypropionitrile was used in an amount of 7 wt %.

Example 3

A 1M solution of $LiPF_6$ in a mixture of EC, PC and DEC (3:2:5, w/w/w) was prepared, and then 3 wt % of vinylene carbonate, 2 wt % of fluoroethylene carbonate (FEC) and 5 wt % of methoxypropionitrile (MPN) were added thereto to prepare an electrolyte solution.

Artificial graphite was prepared as an anode active material. $LiCoO_2$ having a $D_{50}$ of about 15-20 μm as a single-phase structure and $LiNi_{0.53}Co_{0.2}Mn_{0.27}O_2$ having a $D_{50}$ of about 5-8 μm as an aggregate of microparticles having a size of about 1-2 μm were mixed in a weight ratio of 7:3 to prepare a cathode active material. In accordance with a standard method known in the art, a prismatic lithium secondary battery was manufactured using the electrolyte solution, the anode active material, the cathode active material and an aluminum can.

Example 4

A lithium polymer battery was manufactured in the same manner as in Example 3, except that methoxypropionitrile was used in an amount of 7 wt %.

Example 5

A 1 M solution of $LiPF_6$ in a mixture of EC, PC and DEC (3:4:3, w/w/w) was prepared, and then 2 wt % of vinylene carbonate, 2 wt % of fluoroethylene carbonate (FEC) and 2 wt % of methoxypropionitrile (MPN) were added thereto to prepare an electrolyte solution.

Artificial graphite was prepared as an anode active material. A mixture of 100 parts by weight of $LiCoO_2$ and 1 part by weight of aluminum powder was thermally treated to coat the $LiCoO_2$ with the aluminum. The aluminum-coated $LiCoO_2$ was used as a cathode active material. In accordance with a standard method known in the art, a prismatic lithium secondary battery was manufactured using the electrolyte solution, the anode active material, the cathode active material and an aluminum can.

Comparative Example 1

A lithium polymer battery was manufactured in the same manner as in Example 1, except that methoxypropionitrile was not added and vinylene carbonate and fluoroethylene carbonate were added in amounts of 3 wt % and 2 wt %, respectively.

Comparative Example 2

A lithium polymer battery was manufactured in the same manner as in Example 2, except that vinylene carbonate and fluoroethylene carbonate were not added and methoxypropionitrile was added in an amount of 7 wt %.

Comparative Example 3

A prismatic lithium secondary battery was manufactured in the same manner as in Example 3, except that methoxypropionitrile was not added and vinylene carbonate and fluoroethylene carbonate were added in amounts of 3 wt % and 2 wt %, respectively.

Comparative Example 4

A prismatic lithium secondary battery was manufactured in the same manner as in Example 3, except that methoxypropionitrile was added in an amount of 10 wt %.

Comparative Example 5

A prismatic lithium secondary battery was manufactured in the same manner as in Example 5, except that methoxypropionitrile was not added and vinylene carbonate and fluoroethylene carbonate were added in amounts of 2 wt %, respectively.

The following tests were conducted to evaluate the safety of the electrolyte solutions prepared in Examples 1-5 and Comparative Examples 1-5.

1. Test for Storage Safety at High Temperature

Before testing, the thicknesses of the batteries manufactured in Examples 1-3 and 5 and Comparative Examples 1, 3 and 5 were measured. The batteries were fully charged to 4.2 V. Variations in the thickness of the batteries were measured during storage at 90° C. for 5 hr. The results are classified in Tables 1-3 depending on the cathode active materials used. The thickness variations ($\Delta t$) of the batteries manufactured in Examples 1-3 and 5 were expressed by values relative to those (100%) of the batteries manufactured in the corresponding comparative examples. The thickness variations of the batteries manufactured in Examples 1-2 and Comparative Example 1 are graphically shown in FIG. 1.

TABLE 1

| Cathode active material: $LiCoO_2$ | $\Delta t$ (%) |
|---|---|
| Example 1 | 68.6 |
| Example 2 | 49.2 |
| Comparative Example 1 | 100 |

TABLE 2

| Cathode active material: $LiCoO_2$ + $LiNi_{0.53}Co_{0.2}Mn_{0.27}O_2$ | $\Delta t$ (%) |
|---|---|
| Example 3 | 91.1 |
| Comparative Example 3 | 100 |

TABLE 3

| Cathode active material: $LiCoO_2$/Al | $\Delta t$ (%) |
|---|---|
| Example 5 | 72.8 |
| Comparative Example 5 | 100 |

As can be seen from the results in Tables 1-3, the inventive batteries of Examples 1, 2, 3 and 5 underwent much less thickness variations (i.e. less swelling) during long-term storage at high temperature than the batteries of Comparative Examples 1, 3 and 5 although there were slight differences depending on the shape of the batteries. Particularly, the use of 5 wt % of methoxypropionitrile inhibited the swelling of the polymer battery by about 30%, and the use of 7 wt % of methoxypropionitrile inhibited the swelling of the polymer battery by about 50%.

2. Test for Safety During Overcharging

Figure 2:
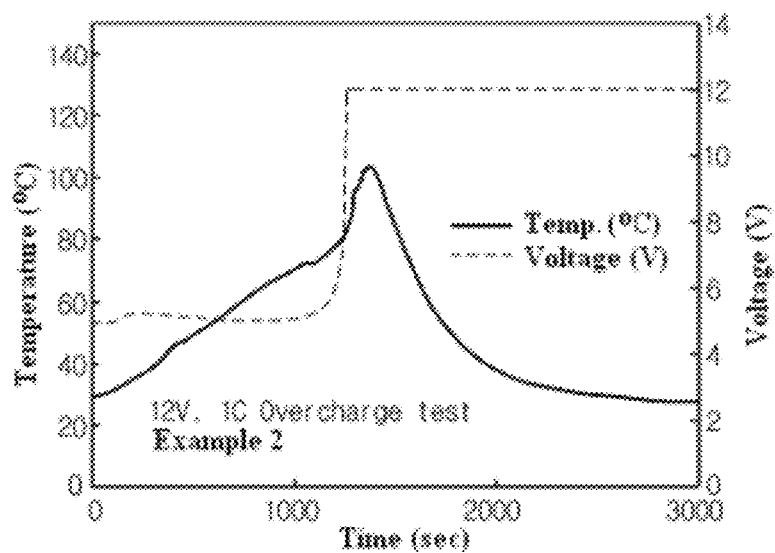
FIGS. 2 to 4 are graphs showing whether fire and explosion occurred in overcharge tests on batteries manufactured in Example 2 and Comparative Examples 1 and 2 under CC/CV (Constant Current/Constant Voltage) with 12 V and 1 C conditions, respectively.
Figure 3:
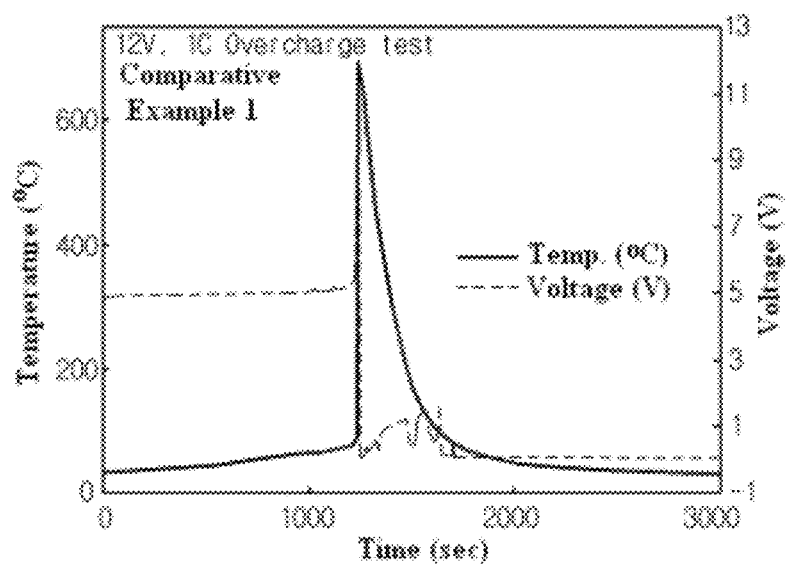
Figure 4:
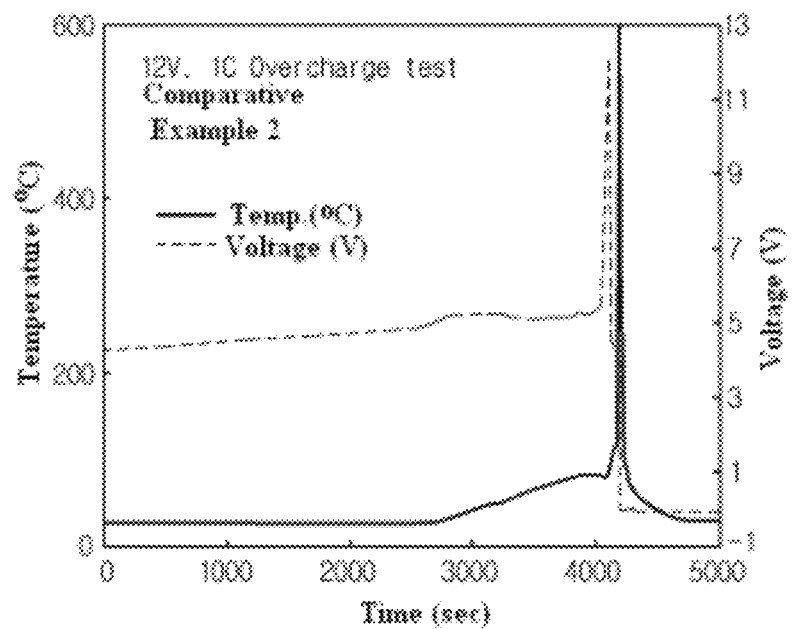

The batteries manufactured in Examples 1-2 and Comparative Examples 1-2 were overcharged under CC/CV (Constant Current/Constant Voltage) with 12 V and 1 C conditions. Test results obtained after repeated overcharging are graphically shown in FIGS. 2-4 and are summarized in Table 4.

TABLE 4

| | Additive 1 | Additive 2 | Safety during overcharging |
|---|---|---|---|
| Example 2 | Vinylene carbonate 3 wt % + FEC 2 wt % | MPN 7 wt % | Safe |
| Comparative Example 1 | Vinylene carbonate 3 wt % + FEC 2 wt % | — | Fire |
| Comparative Example 2 | — | MPN 7 wt % | Fire |

The results in Table 4 demonstrate that the battery of Example 2, which was manufactured using the electrolyte solution containing vinylene carbonate, fluoroethylene carbonate and 7 wt % of methoxypropionitrile, was safe during overcharging. The safety of the battery of Example 2 is believed to be because —CN of methoxypropionitrile formed a coating on the cathode to control exothermic reactions resulting from rapid oxidation between the cathode and the electrolyte solution, thus inhibiting internal short circuits and fire of the battery.

In contrast, fire was observed in the battery of Comparative Example 1, which was manufactured using only vinylene carbonate and fluoroethylene carbonate, and the battery of Comparative Example 2, which was manufactured using only methoxypropionitrile, in the overcharge safety tests.

3. Tests for Charge/discharge Performance (1) Measurement of Initial Battery Capacity The batteries of Examples 3-4 and Comparative Examples 3-4 were charged at a constant current of 0.5 C (400 mA) at 25° C. until their voltages reached 4.2 V, and thereafter, the batteries were charged at a constant voltage of 4.2 V until their currents reached 50 mA. After completion of the initial charging, the batteries were discharged at a constant current of 0.2 C until their voltages dropped 3 V. The discharge capacity of each battery was defined as initial capacity.

(2) Test for Charge/Discharge Cycles

The batteries were charged at a constant current of 1 C (900 mA) at a temperature of 45° C. until their voltages reached 4.2 V, and thereafter, the batteries were charged at a constant voltage of 4.2 V until their currents reached 50 mA. After completion of the first charging, the batteries were discharged at a constant current of 1 C until their voltages reached 3 V (first cycle). After the first cycle, the discharge capacities of the batteries were measured. The charge/discharge cycle was repeated high temperature. The discharge capacities of the batteries of Examples 3-4 and Comparative Example 4 were measured after each charge/discharge cycle. The results are shown in FIG. 5.

Figure 5:
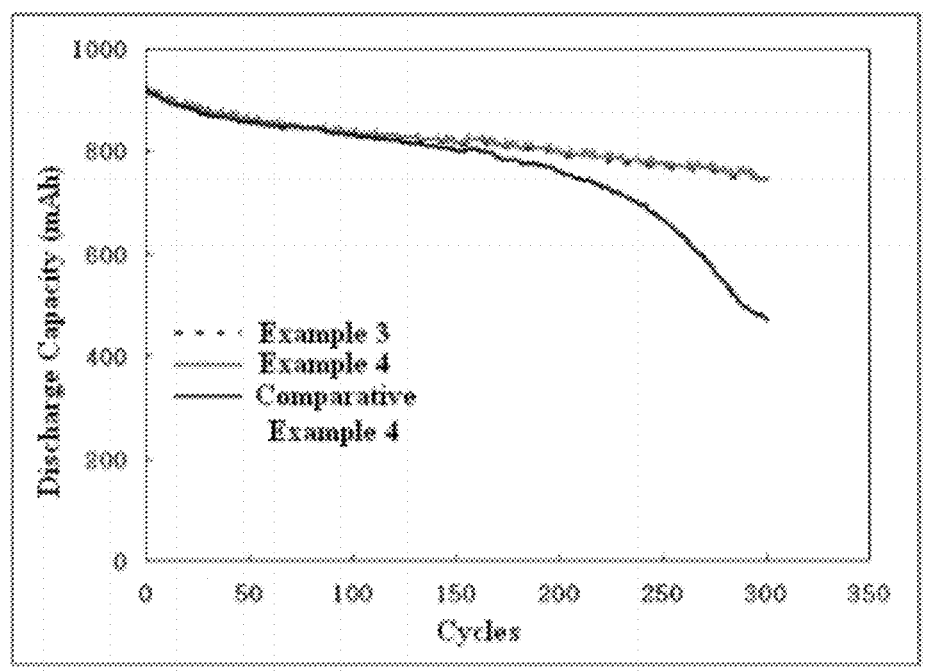
FIG. 5 is a graph showing variations in the discharge capacity of batteries manufactured in Examples 3-4 and Comparative Example 4 as charge/discharge cycles proceeded.

As shown in FIG. 5, the initial capacities of the batteries of Examples 3-4 and Comparative Example 4, each of which was manufactured using methoxypropionitrile as an additive, were almost identical. However, the discharge capacity of the battery of Comparative Example 4, which was manufactured using excess (10 wt %) methoxypropionitrile, was decreased with increasing number of charge/discharge cycles. Particularly, the discharge capacities of the battery of Comparative Example 4 were greatly decreased after 300 charge/discharge cycles. Taking into consideration that a minimum of about 300 cycles is required in batteries for use in related industries (e.g., mobile phones), the battery of Comparative Example 4 is not suitable for practical use.

What is claimed is:

1. A non-aqueous electrolyte solution for a lithium secondary battery comprising an ionizable lithium salt, an organic solvent and additives wherein the additives comprise (a) 1 to 10% by weight of a mixture of a halogenated cyclic carbonate represented by Formula 1:

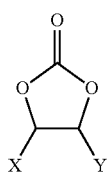

(1)

wherein X and Y are each independently hydrogen, chlorine or fluorine, with the proviso that X and Y are not simultaneously hydrogen, and a compound containing a vinylene or vinyl group, based on the total weight of the non-aqueous electrolyte solution, and (b) 0.1 to 9% by weight of a nitrile compound having a $C_2$-$C_{12}$ alkoxyalkyl group, based on the total weight of the non-aqueous electrolyte solution, wherein the halogenated cyclic carbonate and the vinylene or vinyl group-containing compound are mixed in a weight ratio of 1:0.5 to 1:5.

2. The non-aqueous electrolyte solution according to claim 1, wherein the compound containing a vinylene or vinyl group is selected from the group consisting of vinylene carbonate compounds, vinyl group-containing acrylate compounds, vinyl group-containing sulfonate compounds, vinyl group-containing ethylene carbonate compounds, and mixtures thereof.

3. The non-aqueous electrolyte solution according to claim 1, wherein the compound containing a vinyl group is represented by Formula 2:

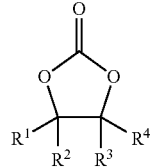

(2)

wherein at least one of $R^1$ to $R^4$ comprises a vinyl group and the others are each independently hydrogen, halogen, a $C_1$-$C_6$ alkyl group optionally substituted with halogen, a $C_6$-$C_{12}$ aryl group, a $C_2$-$C_6$ alkenyl group or a sulfonate group.

4. The non-aqueous electrolyte solution according to claim 1, wherein the alkoxyalkylnitrile compound is represented by Formula 3:

$$C_nH_{2n+1}OC_mH_{2m}CN \qquad (3)$$

wherein n and m are each independently an integer from 1 to 6.

5. The non-aqueous electrolyte solution according to claim 1, wherein the alkoxyalkylnitrile compound is selected from the group consisting of methoxyacetonitrile, methoxypropionitrile, methoxybutyronitrile, methoxyvaleronitrile, ethoxyacetonitrile, ethoxypropionitrile, ethoxybutyronitrile, ethoxyvaleronitrile, and mixtures thereof.

6. The non-aqueous electrolyte solution according to claim 1, wherein the anion of the lithium salt is selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

7. The non-aqueous electrolyte solution according to claim 1, wherein the organic solvent is at least one carbonate compound selected from the group consisting of linear carbonate compounds and cyclic carbonate compounds.

8. The non-aqueous electrolyte solution according to claim 7, wherein the carbonate compound is selected from the group consisting of propylene carbonate, ethylene carbonate, diethyl carbonate, dimethyl carbonate, ethyl methyl carbonate, methyl propyl carbonate, dipropyl carbonate, and mixtures thereof.

9. The non-aqueous electrolyte solution according to claim 7, wherein when the carbonate mixture comprises the linear carbonate, the alkoxyalkyl nitrile compound is present in an amount of 1 to 20 parts by weight, based on 100 parts by weight of the linear carbonate.

10. A lithium secondary battery comprising an anode, a cathode and the non-aqueous electrolyte solution according to claim 1.

11. The lithium secondary battery according to claim 10, wherein the cathode comprises a mixture of $Li_xCoO_2$ (0.5<x<1.3) and $Li_x(Ni_aCo_bMn_c)O_2$ (0.5<x<1.3, 0<a<1, 0<b<1, 0<c<1, a+b+c=1) or $Li_xCoO_2$ (0.5<x<1.3) coated with aluminum as a cathode active material.

* * * * *